US006625214B1

(12) United States Patent
Umehara et al.

(10) Patent No.: US 6,625,214 B1
(45) Date of Patent: Sep. 23, 2003

(54) APPARATUS AND METHOD FOR FADE DETECTING AND INFORMATION ENCODING

(75) Inventors: Yasuyuki Umehara, Tokorozawa (JP); Tsutomu Takahashi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/521,343

(22) Filed: Mar. 9, 2000

(30) Foreign Application Priority Data

Mar. 8, 1999 (JP) ........................................... 11-059819

(51) Int. Cl.$^7$ ............................................... H04B 1/66
(52) U.S. Cl. ........................... 375/240.12; 375/240.16; 375/240.24; 382/239; 382/232; 382/238; 382/236; 348/699; 348/595
(58) Field of Search ............................. 375/240.12, 240, 375/240.16, 240.24; 348/699, 700, 416, 701, 595, 400–403, 415, 394–395, 409, 420, 407–408, 413; 382/239, 232, 238, 236

(56) References Cited

U.S. PATENT DOCUMENTS

| | | | | |
|---|---|---|---|---|
| 5,500,689 A | * | 3/1996 | Lam | 348/699 |
| 5,661,524 A | * | 8/1997 | Murdock et al. | 348/416 |
| 5,771,316 A | * | 6/1998 | Uz | 382/239 |
| 5,801,778 A | * | 9/1998 | Ju | 348/416 |
| 5,844,607 A | | 12/1998 | Gebler | |
| 6,049,362 A | * | 4/2000 | Butter et al. | 348/699 |
| 6,057,893 A | * | 5/2000 | Kojima et al. | 348/700 |

FOREIGN PATENT DOCUMENTS

| | | |
|---|---|---|
| EP | 0 710 031 A2 | 5/1996 |
| EP | 0 979 002 A2 | 2/2000 |
| EP | 1 037 469 A2 * | 9/2000 ............ H04N/7/26 |

OTHER PUBLICATIONS

Lee, Jungwoo, "Temporally Adaptive Motion Interpolation Exploiting Temporal Masking in Visual Perception" IEEE Transactions on Image Processing, 3(1994) Sep., No. 5, New York, US.
Shahraray, Behzad, "Scene Change Detection and Content-Based Sampling of Video Sequences", Proceedings of the Spie, Spie, Bellingham, VA, US, vol. 2419.
Divakaran A et al., "Scene Change Detection And Feature Extraction for MPEG–4 Sequences", Proceedings of the Spie, Spie, Bellingham, VA, US, vol. 3656.
Communication dated May 8, 2003.

* cited by examiner

Primary Examiner—Chris Kelley
Assistant Examiner—Shawn S. An
(74) Attorney, Agent, or Firm—Pitney, Hardin, Kipp & Szuch LLP

(57) ABSTRACT

An fade detection device detects fade transitions in a image data signal used for image data compression provided with: an inter-frame difference calculation device calculates the absolute value of the difference at each pixel between two frames, and the sum of the absolute values at all pixels of one frame; a pixel block detection device calculates the absolute value of the difference at each pixel between two pixel blocks, each of which is subdivided from one frame, and detecting a pair of blocks to obtain the minimum value for the sum total of the absolute values at all pixels of one block; an predictive difference calculation device calculates the one frame total of said sum total of the absolute values at all pixels of one block in each pair of blocks detected by said pixel block detection device; a judging device judges whether said fade transitions is generated or not, using said sum total of the absolute values at all pixels of one frame and the one frame total.

14 Claims, 8 Drawing Sheets

APPARATUS AND METHOD FOR FADE DETECTING AND INFORMATION ENCODING

BACKGROUND OF THE INVENTION

1. Field of the Invention

The present invention relates to apparatus and method for an information encoding for performing inter-frame prediction on the basis of motion compensation and intra-frame encoding.

The present invention also relates to apparatus and method for a fade detecting in the information encoding apparatus and method.

2. Description of the Related Art

There are various encoding methods proposed for use of encoding information, especially digital information, which is, for example, stored on a recording medium, or transmitted on a broadcast wave. However, MPEG (moving picture coding expert group) standard is used for recording a moving-picture data on a DVD having about seven times capacity as compared with that of a conventional recording medium such as a CD (Compact disk).

The MPEG standard is an encoding system in which DCT(Discrete Cosine Transform), motion compensation prediction and variable length encoding are combined to carry out compression of an enormous amount of picture data efficiently. DCT processing is performed with respect to predictive error data which is determined as a difference between a current objective frame and a forward or a backward reference frame delivered by means of motion compensation. Then the predictive error data encoded by a DCT is quantized. Additionally, motion vector detection is performed. In the MPEG standard, the frame is divided into macroblocks. Each macroblock includes 16 pixels.times.16 pixels. In the case where any motion is detected every macroblock between the reference frame and the current objective frame, a direction and an amount of the motion is indicated as a motion vector. Then a predictive picture is generated on the basis of the motion vector, the difference at a macroblock between the predictive picture and a reference picture, which generates the motion, is calculating. Further, the difference is encoded by variable length encoding. In this manner, an enormous amount of picture data is compressed efficiently.

However, according to a conventional compression method, in the case where both of a monotonous picture and a complicated picture are compressed at same compression ratio, the complicated picture is compressed so excessively that the compressed complicated picture declines. Therefore, a deterioration of picture quality is occurred.

For example, when a picture having a change of a luminance, so called a fade, whose value of luminance is changed in one direction such as from minimum to maximum and vice versa, is compressed at low bit rate on the basis of MPEG standard, It is known that "block distortion" is often generated.

Therefore, in the conventional compression method, a fade deteccting is executed. If the fade is detected, the bit rate is adapted to the fade, or a motion compensation is adapted to the fade.

However, in the conventional fade detection method, the fade detection is executed by means of calculating an accumulation of value of luminance in each field is calculated, and measuring a change of the accumulation in time domain for several fields. Then fade is determined when the accumulation changes gradually.

In the case of measuring a change of the accumulation in time domain, a delay of frame is occurred until fade is detected, so that some memories for storing the delayed frame are required in order to encode the fade after detected.

Additionally, in accordance with this conventional fade detection method, a scene change or a complicated picture might be detected as fade in error because the fade detection is executed on the basis of a change of value of luminance at each field.

SUMMARY OF THE INVENTION

It is therefore an object of the present invention to provide method and apparatus for a fade detecting, and an information encoding, which are capable to detect fade exactly without extra memories for a fade detecting.

The above object of the present invention can be achieved by an apparatus for detecting fade transitions in image data used for image data compression. The apparatus has an inter-frame difference calculation device, a pixel block detection device, an predictive difference calculation device, and a judging device. The inter-frame difference calculation device calculates an absolute value of a difference at each pixel between two frames, and a sum of absolute values of differences at all pixels of one frame. The pixel block detection device calculates an absolute value of a difference at each pixel between two pixel blocks. Each of block is subdivided from one frame. And the pixel block detection device detects a pair of blocks to obtain the minimum value for a sum of absolute values of differences at all pixels of one block. The predictive difference calculation device calculates a total of sums of the absolute values of differences at all pixels of one block in each pair of blocks, which is detected by the pixel block detection device, for one frame. The judging device judges whether the fade transitions are generated or not, on the basis of the sum of the absolute values at all pixels of one frame, which is calculated by the inter-frame difference calculation device, and the total, which is calculated by the predictive difference calculation device.

According to the fade detecting apparatus of the present invention, the inter-frame difference calculation device calculates an absolute value of a difference, such as luminance, chrominance and the like, at each pixel between two frames. Then the inter-frame difference calculation device calculates a sum of absolute values of differences at all pixels of one frame. Therefore, a correlation between the two frames is obtained, a picture having a high correlation is distinguish from a picture having a low correlation. Next, the pixel block detection device calculates an absolute value of a difference at each pixel between two pixel blocks. Each of block is subdivided from one frame, called macroblock. And the pixel block detection device detects a pair of blocks to obtain the minimum value for a sum of absolute values of differences at all pixels of one block. The predictive difference calculation device calculates a total of sums of the absolute values of differences at all pixels of one block in each pair of blocks, which is detected by the pixel block detection device, for one frame. Therefore, the correlation is obtained every macro block, so that, in the case where a picture has some motion, the correlation between the frame is calculated accurately. Next, the judging device judges whether the fade transitions are generated or not, on the basis of the sum of the absolute values at all pixels of one frame, which is calculated by the inter-frame difference calculation device, and the total, which is calculated by the predictive difference calculation device. That is, both a correlation between two frames and a correlation between the two blocks are used for a fade deteccting. First, a fade picture and a normal picture are accurately distinguished from a scene change and a complicated picture, whose correlation between two frames is lower than the normal and the fade pictures, on the basis of a correlation between two frames. Next, a fade picture is accurately distinguished from a normal picture, which has much more motion than the normal picture on the basis of a correlation between the two blocks. Therefore, a fade picture, whose luminance changes toward one direction at a certain rate for a whole frame, is accurately detected without a detection error.

In one aspect of the fade detecting apparatus of the present invention, the judging device has a first compare device and a second compare device. And the judging device judges that the fade transitions are generated in the case where such a status that the sum is smaller than the first reference value as a result of comparing by the first compare device, and the total is greater than the second reference value as a result of comparing by the second compare device, is continued for a plurality of frames.

According to this aspect, the judging device compares the sum of the absolute values at all pixels of one frame with a first reference value by using the first compare device. In the case where the sum is smaller than the first reference value as a result of comparing by the first compare device, the judging device judges that a current picture is a fade picture or a normal picture. Next, the judging device compares the total with a second reference value by using the first compare device. In the case where the total is greater than the second reference value as a result of comparing by the second compare device, the judging device judges that a current picture is a scene change, a fade picture, or a complicated picture. Therefore, in the case where such a status that the sum is smaller than the first reference value , and the total is greater than the second reference value, there is high possibility that the current picture is a fade picture. Further, sometimes a scene change meets that condition. However, in a fade picture, that status is continued for a plurality of frames, while in a scene change that status can be not continued. Then, in the case where such a status that the sum is smaller than the first reference value, and the total is greater than the second reference value is continued for a plurality of frames, the judging device judges that the fade transitions are generated. Therefore, a fade picture is accurately detected without a detection error as a complicated picture, a scene change, or a normal picture.

In another aspect of the fade detecting apparatus of the present invention, the judging device has a first compare device and a second compare device. And the judging device judges that the fade transitions are generated in the case where such a status that said sum is smaller than the first reference value as a result of comparing by the first compare device, and the total is greater than the second reference value as a result of comparing by the second compare device, is continued for a plurality of frames. Further, the first reference is a border value between said total in the frames where at least a scene change is generated and the total in the frames where a fade transition or a normal picture is generated. And the second reference is a border value between said frame total in the frame where a fade transition or a scene change is generated and said total in the frames where a normal picture is generated.

According to this aspect, the judging device compares the sum of the absolute values at all pixels of one frame with a first reference value by using the first compare device. Further, the first reference is a border value between the total in the frames where at least a scene change is generated and the total in the frames where a fade transition or a normal picture is generated. In the case where the sum is smaller than the first reference value as a result of comparing by the first compare device, the judging device judges that a current picture is a fade picture or a normal picture. Next, the judging device compares the total with a second reference value by using the first compare device. Further, the second reference is a border value between the frame total in the frame where a fade transition or a scene change is generated and the total in the frames where a normal picture is generated. In the case where the total is greater than the second reference value as a result of comparing by the second compare device, the judging device judges that a current picture is a scene change or a fade picture. Therefore, in the case where such a status that the sum is smaller than the first reference value, and the total is greater than the second reference value, there is high possibility that the current picture is a fade picture. Therefore, a fade picture is accurately detected without a detection error as a complicated picture, a scene change, or a normal picture.

The above object of the present invention can be achieved by an apparatus for information encoding. The apparatus has a fade detecting device, a rearrange device, a discrete cosine transform device, a quantize device, a encoding device, an inverse quantize device, an inverse discrete cosine transform device, a motion compensation device, and an operation device. And the inter-frame difference calculation device calculates the sum on the basis of the frame memory of the rearrange device. Further, the predictive difference calculation device calculates the total on the basis of said frame memory of said motion compensation device.

According to this aspect, first, a rearrange device rearranges source frames in a encode processing sequence on the basis of a frame memory. Next, a discrete cosine transform device performs discrete cosine transform processing for image data rearranged. Then, a quantize device quantizes the image data transformed by the discrete cosine transform device on the basis of prescribed quantize scale code. Then, a encoding device performs variable length encode processing for the quantized image data. Then, an inverse quantize device converts the quantized image data into image data. Then, an inverse discrete cosine transform device performs inverse direct cosign transform processing for image data converted by the inverse quantize device. Further, a motion compensation device has a frame memory, and detects a motion vector on the basis of the image data transformed by the inverse discrete cosine transform device and the new objective image data. Further more, a motion compensation device performs motion compensation processing for the image data transformed by the inverse discrete cosine transform device on the basis of the motion vector. Moreover, the inter-frame difference calculation device calculates an absolute value of a difference, such as luminance, chrominance and the like, at each pixel between two frames. Then the inter-frame difference calculation device calculates a sum of absolute values of differences at all pixels of one frame on the basis of the frame memory of the rearrange device. Therefore, a correlation between the two frames is obtained, a picture having a high correlation is distinguish from a picture having a low correlation. Next, the pixel block detection device calculates an absolute value of a difference at each pixel between two pixel blocks on the basis of the frame memory of the motion compensation device. Each of block is subdivided from one frame, called macroblock. And the pixel block detection device detects a pair of blocks to obtain the minimum value for a sum of absolute values of differences at all pixels of one block. The predictive difference calculation device calculates a total of sums of the absolute values of differences at all pixels of one block in each pair of blocks, which is detected by the pixel block detection device, for one frame. Therefore, the correlation is obtained every macro block, so that, in the case where a picture has some motion, the correlation between the frame is calculated accurately. Next, the judging device judges whether the fade transitions are generated or not, on the basis of the sum of the absolute values at all pixels of one frame, which is calculated by the inter-frame difference calculation device, and the total, which is calculated by the predictive difference calculation device. That is, both a correlation between two frames and a correlation between the two blocks are used for a fade deteccting. First, a fade picture and a normal picture are accurately distinguished from a scene change and a complicated picture, whose correlation between two frames is lower than the normal and the fade pictures, on the basis of a correlation between two frames. Next, a fade picture is accurately distinguished from a normal picture, which has much more motion than the normal picture on the basis of a correlation between the two blocks. Therefore, a fade picture, whose luminance changes toward one direction at a certain rate for a whole frame, is accurately detected without a detection error. Further, a frame memory only for a fade deteccting is not required. The frame memory for the rearrange device and the motion compensation device is used for a fade deteccting. Therefore, a cost of production can be reduced.

In one aspect of the encoding apparatus of the present invention, the judging device has a first compare device and a second compare device. And the judging device judges that the fade transitions are generated in the case where such a status that the sum is smaller than the first reference value as a result of comparing by the first compare device, and the total is greater than the second reference value as a result of comparing by the second compare device, is continued for a plurality of frames.

According to this aspect, the judging device compares the sum of the absolute values at all pixels of one frame with a first reference value by using the first compare device. In the case where the sum is smaller than the first reference value as a result of comparing by the first compare device, the judging device judges that a current picture is a fade picture or a normal picture. Next, the judging device compares the total with a second reference value by using the first compare device. In the case where the total is greater than the second reference value as a result of comparing by the second compare device, the judging device judges that a current picture is a scene change, a fade picture, or a complicated picture. Therefore, in the case where such a status that the sum is smaller than the first reference value, and the total is greater than the second reference value, there is high possibility that the current picture is a fade picture. Further, sometimes a scene change meets that condition. However, in a fade picture, that status is continued for a plurality of frames, while in a scene change that status can be not continued. Then, in the case where such a status that the sum is smaller than the first reference value, and the total is greater than the second reference value is continued for a plurality of frames, the judging device judges that the fade transitions are generated. Therefore, a fade picture is accurately detected without a detection error as a complicated picture, a scene change, or a normal picture. The frame memory for the rearrange device and the motion compensation device is used for a fade deteccting. Therefore, a cost of production can be reduced.

In another aspect of the encoding apparatus of the present invention, the judging device has a first compare device and a second compare device. And the judging device judges that the fade transitions are generated in the case where such a status that said sum is smaller than the first reference value as a result of comparing by the first compare device, and the total is greater than the second reference value as a result of comparing by the second compare device, is continued for a plurality of frames. Further, the first reference is a border value between said total in the frames where at least a scene change is generated and the total in the frames where a fade transition or a normal picture is generated. And the second reference is a border value between said frame total in the frame where a fade transition or a scene change is generated and said total in the frames where a normal picture is generated. The frame memory for the rearrange device and the motion compensation device is used for a fade deteccting. Therefore, a cost of production can be reduced.

According to this aspect, the judging device compares the sum of the absolute values at all pixels of one frame with a first reference value by using the first compare device. Further, the first reference is a border value between the total in the frames where at least a scene change is generated and the total in the frames where a fade transition or a normal picture is generated. In the case where the sum is smaller than the first reference value as a result of comparing by the first compare device, the judging device judges that a current picture is a fade picture or a normal picture. Next, the judging device compares the total with a second reference value by using the first compare device. Further, the second reference is a border value between the frame total in the frame where a fade transition or a scene change is generated and the total in the frames where a normal picture is generated. In the case where the total is greater than the second reference value as a result of comparing by the second compare device, the judging device judges that a current picture is a scene change or a fade picture. Therefore, in the case where such a status that the sum is smaller than the first reference value, and the total is greater than the second reference value, there is high possibility that the current picture is a fade picture. Therefore, a fade picture is accurately detected without a detection error as a complicated picture, a scene change, or a normal picture. The frame memory for the rearrange device and the motion compensation device is used for a fade deteccting. Therefore, a cost of production can be reduced.

In another aspect of the encoding apparatus of the present invention, the encoding device performs compression encoding processing in MPEG2 standard.

According to this aspect, the encoding device performs compression encoding processing to image data at prescribed encoding rate in MPEG2 standard. Therefore, image data is compressed without occurring deterioration of quality of picture.

The above object of the present invention can be achieved by a method for detecting fade transitions in image data signal used for image data compression. This method includes processes as follows: calculating an absolute value of a difference at each pixel between two frames, and a sum of absolute values of differences at all pixels of one frame; calculating an absolute value of a difference at each pixel between two pixel blocks, each of which is subdivided from one frame, and detecting a pair of blocks to obtain the minimum value for a sum of absolute values of differences at all pixels of one block; calculating a total of sums of the absolute values of differences at all pixels of one block in each pair of blocks detected; and judging whether said fade transitions is generated or not, on the basis of said sum of the absolute values at all pixels of one frame and said total.

According to the fade detecting method of the present invention, the same advantageous effect of the aforementioned detecting apparatus of the invention can be achieved.

In one aspect of the fade detecting method of the present invention, the judging process provided with a comparing process of a sum of the absolute values at all pixels of one frame with a first reference value, and comparing process of the total with a second reference value, and the judging process of that the fade transitions are generated in the case where such a status that the sum is smaller than said first reference value as a result of said comparing process, and the total is greater than said second reference value as a result of the comparing process, is continued for a plurality of frames.

According to the fade detecting method of the present invention, the same advantageous effect of the aforementioned detecting apparatus of the invention can be achieved.

In another aspect of the fade detecting method of the present invention, in the judging process provided with: comparing process of the sum of the absolute values at all pixels of one frame with a first reference value; and comparing process of the total with a second reference value, the judging process of that the fade transitions are generated in the case where such a status that the sum is smaller than the first reference value as a result of the comparing process, and the total is greater than the second reference value as a result of the comparing process, is continued in a plurality of frames, the first reference is a border value between the sum in the frames where at least a scene change is generated and the total in the frames where a fade transition or a normal picture is generated; and the second reference is a border value between the total in the frame where a fade transition or a scene change is generated and the total in the frames where a normal picture is generated.

According to the fade detecting method of the present invention, the same advantageous effect of the aforementioned detecting apparatus of the invention can be achieved.

The above object of the present invention can be achieved by a method for information encoding. This method includes processes as follows: (a) detecting fade transitions in image data used for image data compression provided with: calculating an absolute value of a difference at each pixel between two frames, and a sum of absolute values of differences at all pixels of one frame; calculating an absolute value of a difference at each pixel between two pixel blocks, each of which is subdivided from one frame, and detecting a pair of blocks to obtain the minimum value for a sum of absolute values of differences at all pixels of one block; calculating a total of sums of the absolute values of differences at all pixels of one block in each pair of blocks detected, for one frame; and judging whether said fade transitions are generated or not, on the basis of said sum of the absolute values at all pixels of one frame and said total, (b) rearranging source frames in a encode processing sequence on the basis of a frame memory, (c) performing discrete cosine transform processing for image data, (d) quantizing said image data transformed by said discrete cosine transform process on the basis of prescribed quantize scale code, (e) performing variable length encode processing said quantized image data, (f) converting said quantized image data into image data, (g) performing inverse direct cosign transform processing for image data converted by said inverse quantize process, (h) detecting a motion vector on the basis of said image data transformed by said inverse discrete cosine transform process and the new objective image data, and performing motion compensation processing for said image data transformed by said inverse discrete cosine transform process on the basis of said motion vector, (i) calculating a difference between a source image data and a predictive data generated by said motion compensation process, (j) said calculating process of said sum is on the basis of said frame memory, and (k) said calculating process of said total is on the basis of said frame memory.

According to the information encoding method of the present invention, the same advantageous effect of the aforementioned encoding apparatus of the invention can be achieved.

In one aspect of the information encoding method of the present invention, the judging process provided with: a comparing process of the sum of the absolute values at all pixels of one frame with a first reference value; and a comparing process of the total with a second reference value, and the judging process of that said fade transitions are generated in the case where such a status that the total is smaller than the first reference value as a result of the comparing process, and the total is greater than the second reference value as a result of said comparing process, is continued for a plurality of frames.

According to the information encoding method of the present invention, the same advantageous effect of the aforementioned encoding apparatus of the invention can be achieved.

In another aspect of the information encoding method of the present invention, in the judging process provided with: comparing process the sum of the absolute values at all pixels of one frame with a first reference value; and comparing the total with a second reference value, the judging process of that the fade transitions are generated in the case where such a status that the sum is smaller than the first reference value as a result of the comparing process, and the total is greater than the second reference value as a result of the comparing process, is continued for a plurality of frames, the first reference is a border value between the sum in the frames where at least a scene change is generated and the total in the frames where a fade transition or a normal picture is generated, and the second reference is a border value between the total in the frame where a fade transition or a scene change is generated and the total in the frames where a normal picture is generated.

According to the information encoding method of the present invention, the same advantageous effect of the aforementioned encoding apparatus of the invention can be achieved.

In another aspect of the information encoding method of the present invention, the encoding device performs compression encoding processing in MPEG2 standard.

According to the information encoding method of the present invention, the same advantageous effect of the aforementioned encoding apparatus of the invention can be achieved.

DETAILED DESCRIPTION OF THE PREFERRED EMBODIMENTS

Referring to the accompanying drawings, embodiments of the present invention will be now explained. In the following explanation, the present invention is adapted for encoding apparatus performing compressing a moving picture in conformity with MPEG2 standard.

An embodiment of fade detecting and information encoding apparatus of the present invention is explained with FIGS. 1 to 8.

Figure 1:
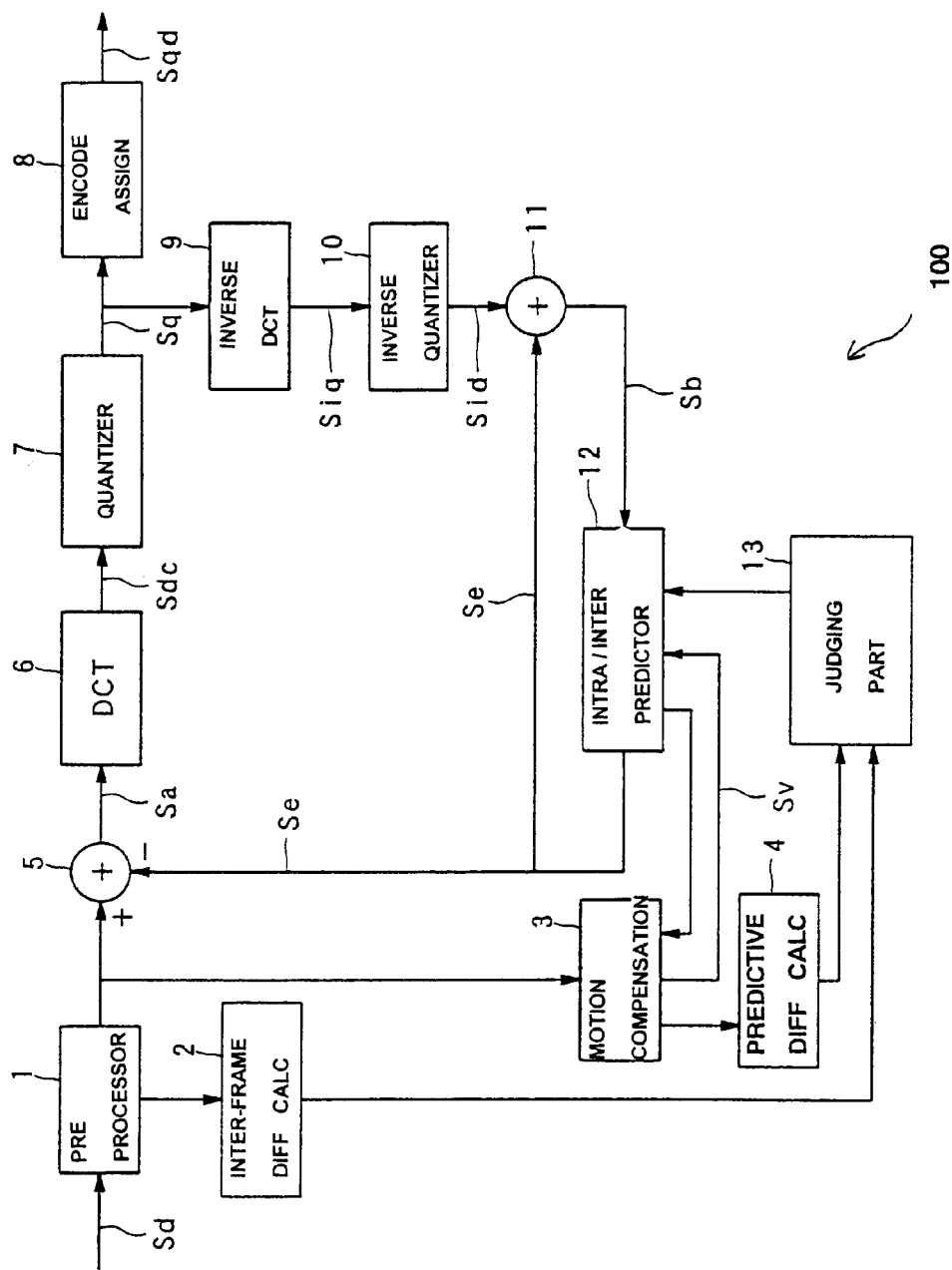
FIG. 1 is a block diagram showing outline construction of an encoding apparatus having fade detecting apparatus of an embodiment.

In FIG. 1, an outline construction of the encoding apparatus 100 of the present invention is shown. The encoding apparatus 100 has a preprocessor 1, an inter-frame difference calculator 2, a motion compensation 3, a predictive difference calculator 4, an adder 5, a DCT 6, a quantizer 7, an code assignment 8, an inverse quantizer 9, an inverse DCT 10, an adder 11, an inter/intra-frame predictor 12, and a judging part 13.

The preprocessor 1 combines input fields to produce each frame, and rearranges a sequence of frames, which have a time-series sequence of input fields, in necessary sequence for encoding. The preprocessor 1 includes a frame memory for the combing and rearranging processes, and extracts image data from digital information signal Sd inputted from an external device, and stores the image data in the frame memory. This image data consists of a plurality of fields having a first field and a second field shown in FIG. 2, each of which is digitized pixel by pixel. Further, the preprocessor 1 outputs a sequence of frames to the motion compensation 3 and the adder 5 in necessary sequence for encoding.

Figure 2:
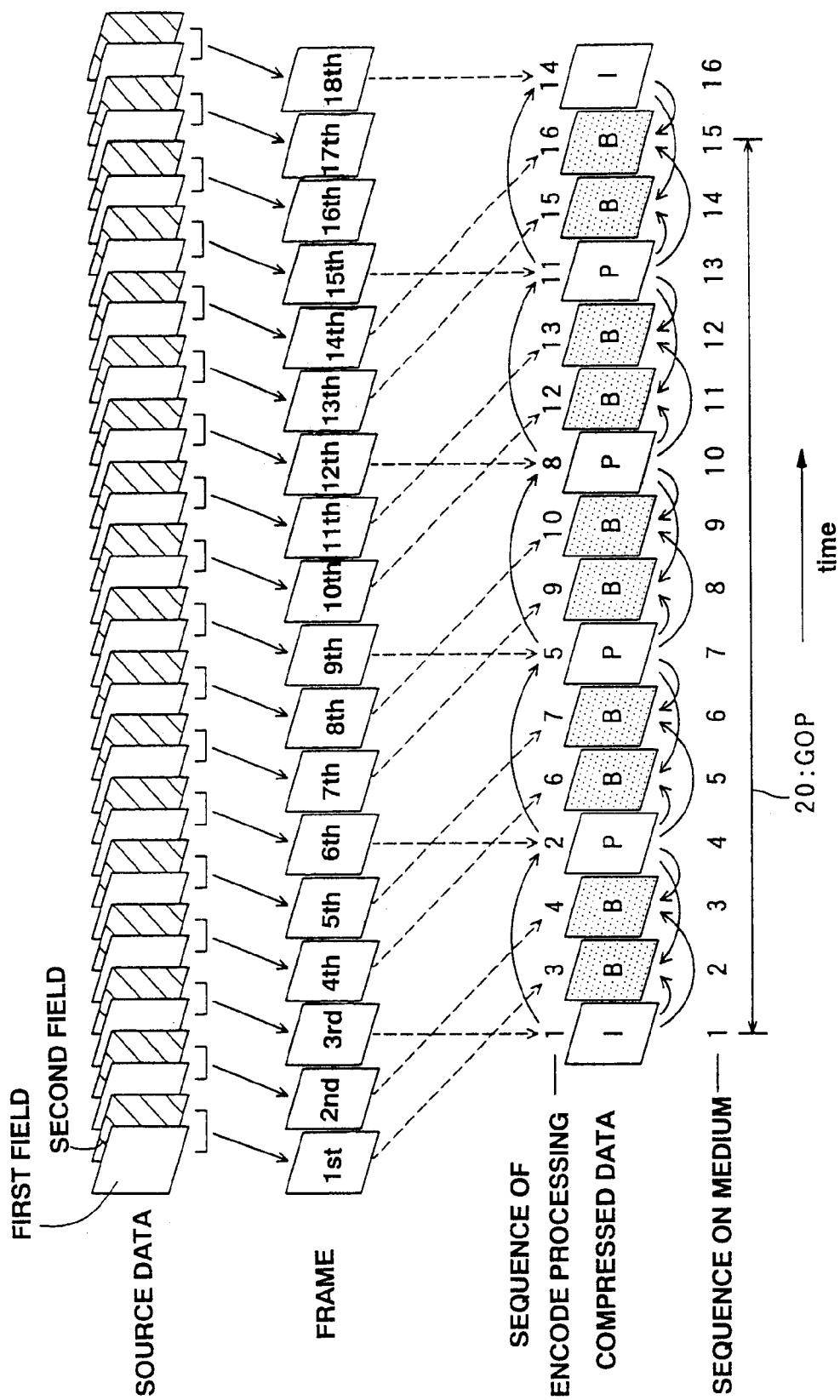
FIG. 2 is a view for explaining the relationship among original picture input to the encoding apparatus shown as FIG. 1, frame picture before compressed by the encoding apparatus, and frame picture after compressed by the encoding apparatus.

In FIG. 2, an outline of correlation between the time-series sequence of input fields and a sequence for encoding is shown.

In MPEG2 standard, compressed image data is provided with an information unit called a video pack, which is provided with one or a plurality of information units called GOP(Group Of Picture). In FIG. 2, one GOP 20 includes fifteen frames whose time for reproduction is approximately 0.5 sec. One GOP normally includes fifteen frames, however, the number of frames which are included in one GOP 20 is not restricted in MPEG2 standard.

In FIG. 2, a frame indicated with a letter "I", which is designated I-picture (Intra-coded picture), includes sufficient encoded data for reconstruction of a complete image from only its data.

A frame indicated with a letter "P", which is designated P-picture (Predictive-coded picture), is encoded on the basis of forward prediction. In the forward prediction, a forward picture, which is a former picture in decoding order to a current objective picture for encoding, is generated as a predictive picture by predicting processing on the basis of the current picture. Then, a difference between the predictive picture and the current picture is calculated. Finally, the difference is encoded. Further, the predictive picture is generated on the basis of motion compensation. In the motion compensation, between the current source frame and a frame decoded previously. In the case where P-picture is the current source frame, the predicted frame is generated with respect to I-picture or P-picture coded previously.

A frame indicated with a letter "B", which is designated B-picture (Bidirectionally predictive-coded picture), is coded using both of forward and backward prediction. In the backward prediction, a backward picture, which is a later picture in decoding order to a current objective picture for encoding, is generated as a predictive picture by predicting processing on the basis of the current picture. Then, a difference between the predictive picture and the current picture is calculated. Finally, the difference is encoded. In the case where B-picture is the current source frame, predicted frames are generated with respect to I-picture or P-picture coded previously and subsequently.

In FIG. 2, the relationship between a current source frame and reference frames for prediction is indicated using arrows above or below each box. I-picture is encoded using intra-frame encoding without using of a prediction memory, while P-picture is encoded using forward directionally inter-frame encoding with one prediction memory, and B-picture is encoded using Bidirectionally inter-frame encoding with two prediction memories.

Thus, in MPEG2 standard requires compression encoding in different order from input fields because of use of not only P-picture but also B-picture. For example, indicated in FIG. 2, preprocessor 1 skips a first frame and a second frame outputting a third frame previously, and skips a fourth frame and a fifth frame outputting a sixth frame previously for compression process. As a consequence, the third frame is encoded as I-picture, and the sixth frame is encoded as P-picture. Then the preprocessor 1 outputs the first, second, third, and fourth frame in this order so that each frame is encoded as B-picture and inserted between P-picture and I-picture, or between two P-picture. As a consequence, GOP 20, in which each frame includes the relationship of time sequence and prediction, is generated.

In this embodiment, one GOP 20 includes fifteen frames. Preprocessor 1 determines the type of each frame in predetermined order. For example, I-picture is located in the head of GOP 20. P-picture is located every two frame from the head. Two B-picture are located between I-picture and P-picture, or between two P-picture.

The inter-frame difference calculator 2 calculates the sum total of absolute values of differences in luminance and chrominance at all pixels between adjacent frames. However, the calculator 2 performs the calculation on the basis of fields corresponding to frames stored in a frame memory instead of using the frames. For example, in the case where the calculation is performed with respect to the first and the second frames, first,the sum of absolute values of the differences in luminance and chrominance at all pixels between a first field corresponding to the first frame and a first field corresponding to the second frame is calculated. That is, assume that F21 is a first field corresponding to the second frame, and F11 is a first field corresponding to the first frame, the first subtotal of absolute values of the differences between a first field F21 and a first field F11 is calculated as expressed by the following equation:

$$\text{first subtotal} = \text{SUM}|Y1-Y1'| + \text{SUM}|Cb1-Cb1'| + \text{SUM}|Cr1-Cr1'|$$

where Y1 is luminance of one pixel in the first field F21, Cb1 is chrominance blue of the pixel, Cr1 is chrominance red of the pixel, Y1' is luminance of one pixel in the first field F11, Cb1' is chrominance blue of the pixel, Cr1' is chrominance red of the pixel, and SUM provides the sum of the differences at all pixels with respect to one field.

Next, assume that F22 is a second field corresponding to the second frame, and F12 is a second field corresponding to the first frame, the second subtotal of absolute values of the differences between a second field F22 and a second field F12 is calculated as expressed by the following equation:

$$\text{second subtotal} = \text{SUM}|Y2-Y2'| + \text{SUM}|Cb2-Cb2'| + \text{SUM}|Cr2-Cr2'|$$

where Y2 is luminance of one pixel in the second field F22, Cb2 is chrominance blue of the pixel, Cr2 is chrominance red of the pixel, Y2' is luminance of one pixel in the second field F12, and Cb2' is chrominance blue of the pixel, Cr2' is chrominance red of the pixel.

Then the sum of the first subtotal and the second subtotal provides the sum total of absolute values of the differences between the first and the second frames.

In this manner, by calculating the sum total of absolute values of the inter-frame differences, the correlation between two consecutive frames in time sequence can be detected. Further, the correlation enables rough fade detection. For example, a fade, whereby luminance increases or decreases gradually, indicates comparatively high correlation between the consecutive frames and provides comparatively small amount of the sum. On the other hand, a scene change, whereby the continuity of a moving picture is lost, indicates no correlation between the consecutive frames and provides comparatively large amount of the sum.

In this embodiment, the calculator 2 outputs the result of the calculation to the judging part 13 described below, then the judging part 13 performs fade detection using the sum total of absolute values of the inter-frame differences and processing corresponding to the detection. The fade detection in the judging part 13 is described below.

Figure 3:
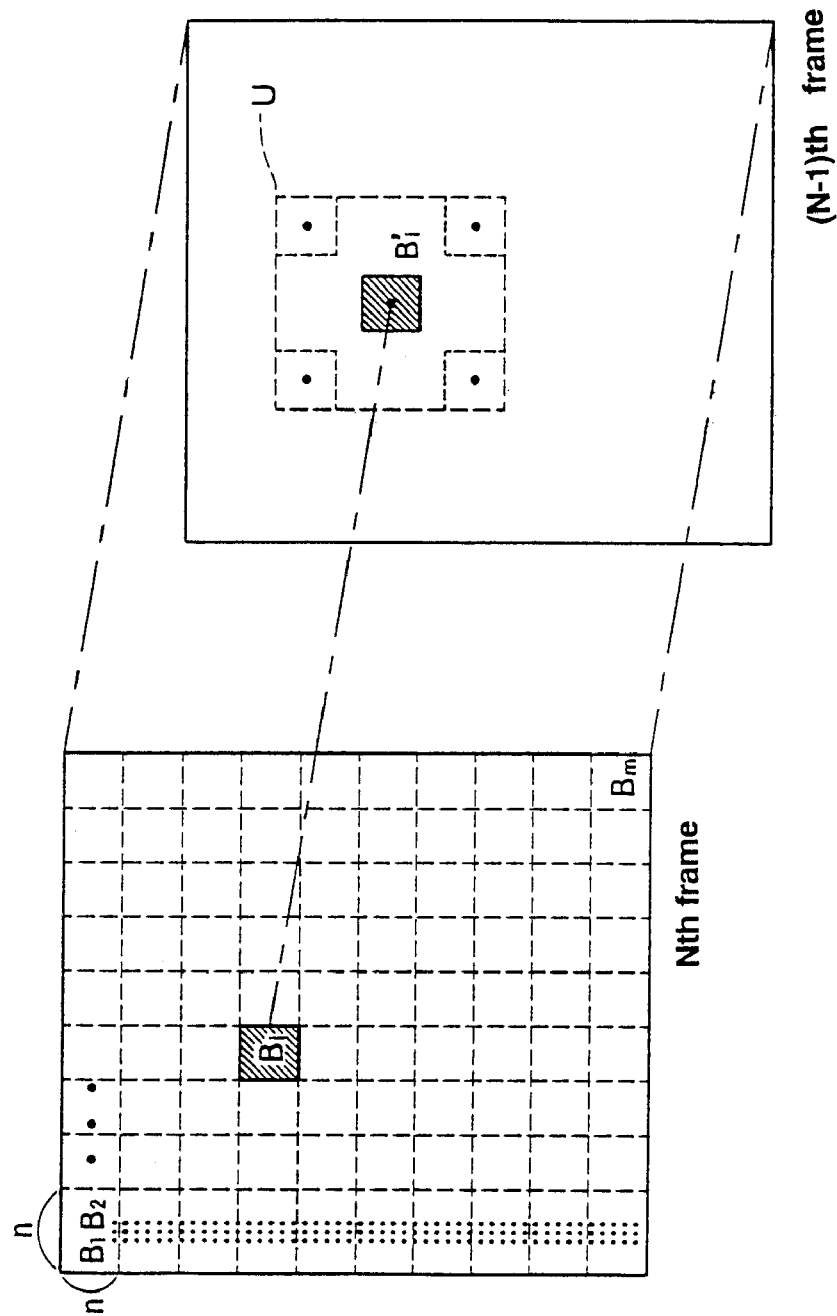
FIG. 3 is a view for explaining motion vector detection process of motion compensation in the encoding apparatus and distortion calculating process in the absolute value of sum of predictive difference calculator in the encoding apparatus.

The motion compensation 3 calculates a motion vector using frames outputted in predictive coding sequence from the preprocessor 1. The motion vector is used for motion compensation performed by inter/intra-frame predictive encoder 12. The motion compensation 3, first, as indicated in FIG. 3, divides the Nth frame, which is current source frame, into macroblocks B1-Bm including n.times.n pixels. Then the motion compensation 3 calculates the sum total of absolute values of the pixel differences at all pixels in macroblock Bi between each pixel in macroblock Bi, which is one of macroblocks in the Nth frame, and each pixel in macroblock B'i, which is encoded prior to macroblock Bi in the (N−1)th frame. Next, the motion compensation 3 calculates the sum total in the prescribed range U, which is set around the center of macroblock B'i in the (N−1)th frame, while changing the position of the center. Further, the motion compensation 3 decides the macroblock B'i providing the minimum value of the sum total is the most similar to the macroblock Bi. Finally, the motion compensation 3 calculates the spatial position of the macroblock B'i in the (N−1)th frame, which provides the direction and the amount of motion from the macroblock Bi to the macroblock B'i, to obtain the motion vector.

Hereafter, the motion compensation 3 performs the processing in the same manner with respect to whole macroblocks B1-Bm to output obtained macroblocks as vector signal Sv to the inter/intra-frame predictive encoder 12.

The predictive difference calculator 4 calculates the sum total of the predictive differences for one frame, which is calculated with respect to each macroblock B1-Bm to obtain the motion vector by the motion compensation 3, to obtain the sum total of absolute values of prediction error (hereafter referred to distortion). Then the distortion sum calculator 4 outputs the distortion to the judging part described below.

In this manner, by calculating the distortion, the correlation between two consecutive frames in time sequence can be detected highly accurately even though motion is detected between two consecutive frames. Further, the correlation provides accurate fade detection. In this embodiment, predictive difference calculator 4 outputs the distortion to the judging part 13, which detects fade on the basis of the inter-frame difference and the sum of predictive difference. This detection process is described below.

The adder 5 adds a preprocessed digital signal Sd, which is outputted from the preprocessor 1, accepted to noninverting input and a compensation signal Se, which is outputted from inter/intra-frame predictive encoder 12, accepted to inverting input. As a result of this add processing, a subtracted signal Sa is provided as the difference between the digital signal Sd and the compensation signal Se, and accepted to DCT6. In the case of the inter-frame prediction, the luminance difference at each pixel between a current source frame and a predictive frame are calculated. Then a difference frame which includes the luminance difference in each pixel is included in the subtracted signal Sa. On the other hand, in the case of the intra-frame prediction, the signal of a current source frame itself is included in the subtracted signal Sa because of no predictive frame provided.

The DCT 6 divides the difference frame included in the subtracted signal Sa outputted from adder 3 or a current source frame for intra-frame predictive encoding into p.times.p (p<n) pixel blocks, which is smaller than the above-mentioned macroblock 30, to perform orthogonal transformation called Discrete Cosine Transform at each pixel. The orthogonal transformation is the processing whereby image data is resolved into components of spatial frequency. The DCT 6 assigns coefficient of each component of frequency provided by the orthogonal transformation to each pixel of p.times.p pixel block in the order of increasing frequency. The pixel values, i.e. the luminance values are distributed on a random basis before the transformation is performed, while, assume that the coefficients assigned on pixels are the pixel values, the coefficients having the comparative large number of value have the property of concentrating to low frequency side after the transformation is performed. DCT6 outputs transformed signal Sdc obtained as a result of the transformation processing to the quantizer 7.

The quantizer 7 quantizes the transformed signal Sdc outputted from the DCT 6 using prescribed quantize scale code to generate a quantized signal Sq, and output the signal Sq to the encode assign part 8 and inverse quantizer 9. To be more specific, the quantizer 7 divides the coefficient included in the transformed signal Sdc at each pixel block by the prescribed quantize scale code, and rounds a remainder toward zero. As a result of this processing, most of the pixel values except for values in low frequency side, where large number values are concentrated, are zero so that compression rate can be high.

The encoder assign part 8 performs variable length encoding to the DCT coefficient included in the quantized signal Sq outputted from the quantizer 7. In this assign processing, short encode length is assigned to the DCT coefficient with high probability of occurrence, while long encode length is assigned to the DCT coefficient with low probability of occurrence. As a result of this processing, a compressed information signal Sqd, which is a signal compressed an original digital signal by MPEG2 standard, is generated. The encode assign part 8 output this compressed information signal Sqd to encode buffer memory (not depicted in any figures). This compressed information signal Sqd includes the above-mentioned I-picture, B-picture, and P-picture.

The inverse quantizer 9 performs inverse quantizing processing for the quantized signal Sq to generate an inverse quantized signal Siq, and output this signal Siq to the inverse DCT 10. In this inverse quantize processing, the prescribed scale code is added at each pixel to quantized coefficient at each pixel block included in the quantized signal Sq.

The inverse DCT 10 performs inverse DCT processing for the inverse quantized signal Siq to generate an inverse transformed signal Sid, and output the signal Sid to adder 11. In this inverse DCT processing, image data of each component of frequency is superposed according to the proportion of the coefficient for the each component of frequency. As a result of this processing, an original source frame is decoded in the intra-frame encoding, while the inter-frame differences are encoded in the inter-frame encoding.

The adder 11 adds the inverse transformed signal Sid and the below-mentioned compensation signal Se outputted from intra/inter-frame predictor 12. In this adding processing, the original source frame in the inter-frame prediction is decoded. The adder 11 outputs added signal Sb to the intra/inter-frame predictor 12 as a result of adding.

The intra/inter-frame predictor 12 performs compensate processing using the motion vector outputted included in a vector signal outputted from the motion compesation 13 and the decoded original source frame included in the added signal Sb outputted from the adder 11. The intra/inter-frame predictor 12 is provided with two prediction memories so that the predictor 12 can perform both directional prediction. For example, by using the fourth frame, the fifth frame, the sixth frame, and the ninth frame, this both directional prediction is described as follows:

First, the sixth frame is coded by the DCT 6 and the quantizer 7, and decoded by the inverse quantizer 9 and the inverse DCT 6. Then the decoded sixth frame is stored in the first prediction memory of the intra/inter-frame predictor 12 temporarily.

Next, the ninth frame is encoded. In this encoding, the prediction picture is generated using the sixth frame stored in the first prediction memory and the below-mentioned motion vector by the intra/inter-frame predictor 12. Then the difference picture between the prediction picture and the ninth frame is encoded. Therefore the picture decoded by the inverse quantizer 9 and the inverse DCT 10 is this difference picture. Further the difference picture and the sixth frame stored in the first prediction memory are added by adder 11 so that the ninth frame is decoded. Then this decoded ninth memory is stored in the second prediction memory.

Next, the fourth frame is encoded. This encoding is performed using forward prediction and backward prediction. The forward prediction is performed to the difference picture between the fourth frame and the prediction picture, which is generated using the sixth frame stored in the first memory and the motion vector. Then the backward prediction is performed to the difference picture between the fourth frame and the prediction picture, which is generated using the ninth frame stored in the second memory and the motion vector. Further the fifth frame is encoded same as the fourth frame.

In this manner, the both directional prediction can be performed by the intra/inter-frame predictor 12 with the two prediction memory.

Figure 4:
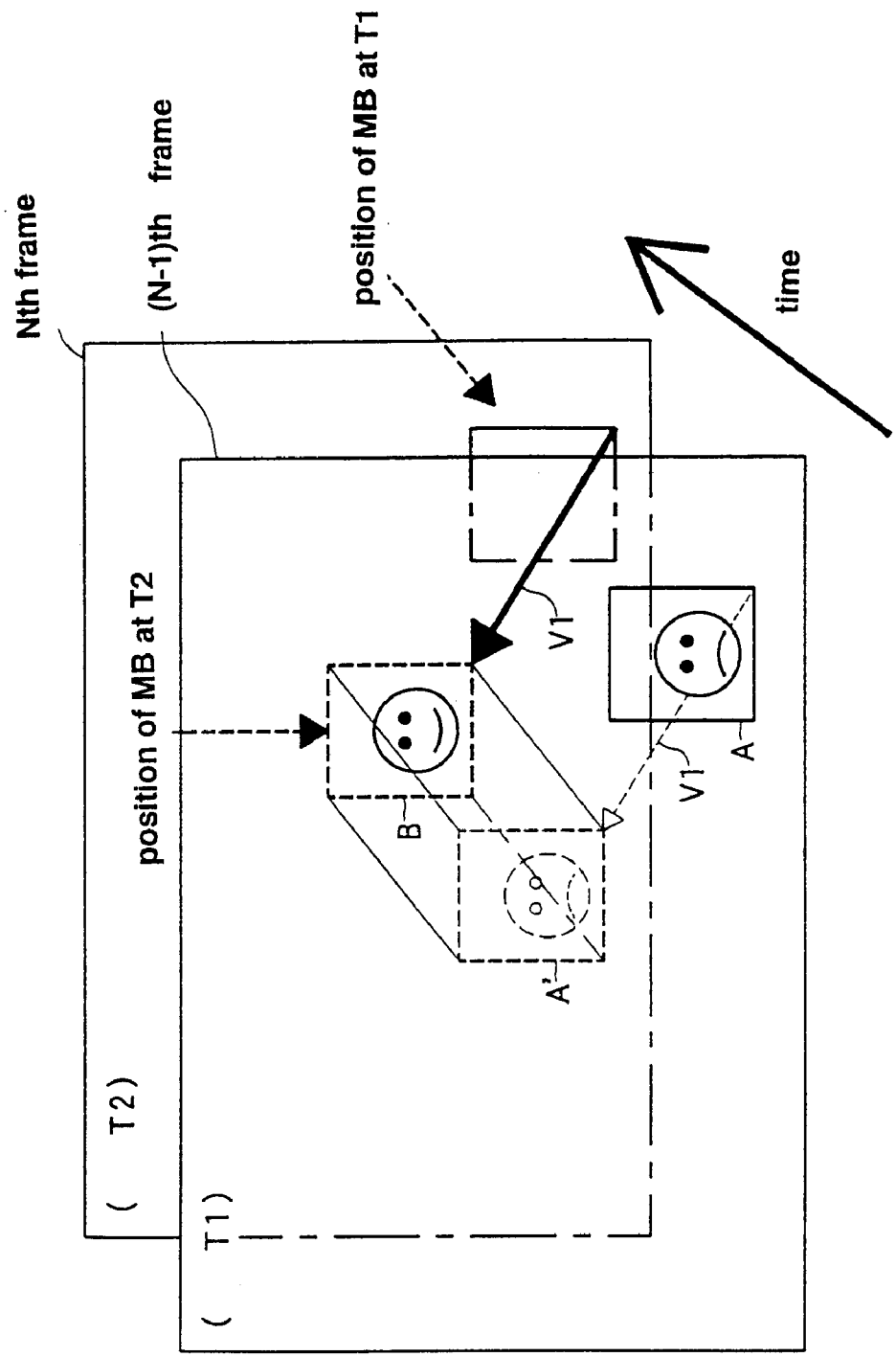
FIG. 4 is a view for explaining producing process of predictive picture in intra/inter-frame predictor in the encoding apparatus.
Figure 5:
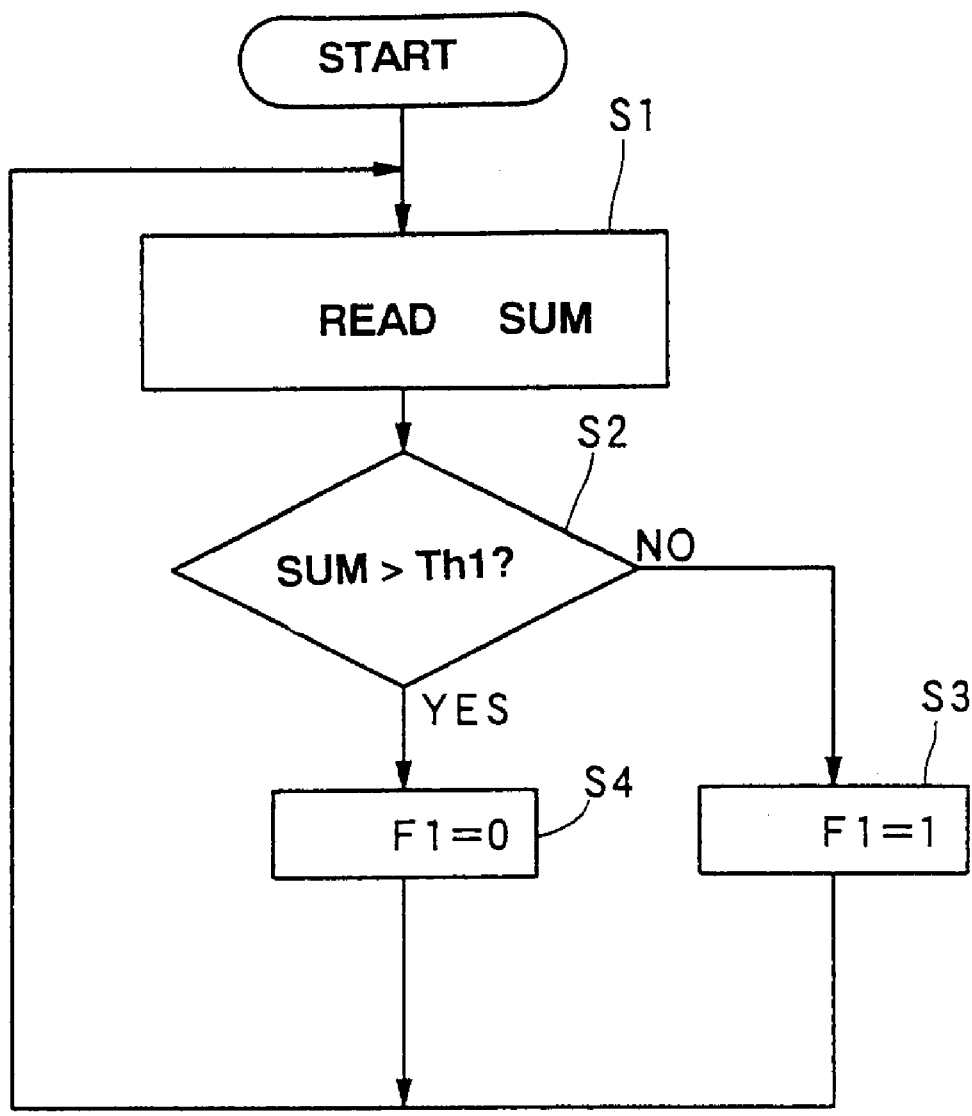
FIG. 5 is a flow diagram of judging process on the basis of a sum of an absolute value of inter-frame difference in the encoding apparatus.

Here, the example of generating the prediction picture is described as follows. For example, assumed that, as indicated in FIG. 4, the macroblock A in the (N−1)th frame at time T1 changes into the macroblock B in the Nth frame at time T2 (>T1). The motion vector V1, which indicates the spatial correlation between the macroblock A and the macroblock B, is generated by the motion compensation 3. The intra/inter-frame predictor shifts this macroblock A, which is stored in the prediction memory for the N−1th frame, to macroblock A' so that the prediction picture is generated. Then this prediction picture and the Nth frame, which includes the macroblock B, are accepted to adder 5. Therefore the difference picture generated using adding processing by adder 3 is the difference picture between the macroblock B and macroblock A'. Finally, this difference picture and the motion vector are encoded.

In this manner, according to the motion compensation using the motion vector, the amount of information encoded actually can be compressed rather than image data which is encoded directly.

Furthermore, the intra/inter-frame predictor 12 accepts the information that indicates which picture type, i.e. I-picture, B-picture, or P-picture, to be used for the objective picture of encoding. Moreover, the predictor 12 judges which prediction type to be performed, i.e. the inter-frame prediction using the information or the intra-frame prediction. In the case of juding performing the intra-frame prediction, the predictor 12 does not output the compensation signal Se to adder 5.

The judging part 13 detect fade using the sum total of absolute values of the inter-frame differences outputted from calculator 2 and the distortion values outputted from the motion compensation 3. This detection processing is described according to FIG. 5 and FIG. 6 as follows:

First, the rearrangement for the original source frame in the encoding sequence is performed in the preprocessor 1. Then the sum total of absolute values of inter-frame differences is calculated using the fields, whose sequence for encoding is continuous, corresponding to the original source frames stored in the frame memory of the preprocessor 1 by the calculator 2. Then the sum of absolute values of inter-frame differences is outputted by the calculator 2, and read out by the judging part 13(step S1 in FIG. 5). For example, in FIG. 2, the third frame is encoded at first, then the sixth frame is encoded next. Assume that the objective frame for encoding is the sixth frame, the sum total of the differences between the first field corresponding to the sixth frame and the first field corresponding to the third frame, and between the second field corresponding to the sixth frame and the second field corresponding to the third frame are calculated by the calculator 2. Then the sums are added, and outputted to the judging part 13 as the sum total of absolute values of inter-frame differences between the sixth frame and the third frame. Next, the sum total is read out by the judging part 13. The judging part 13 judges the degree of the correlation between the sixth frame and the third frame using the sum total. More specifically, the judging part 13 judges whether the sum total is greater than the prescribed threshold level Th1 or not(step S2 in FIG. 5). This threshold level Th1 is determined by experiment so that the complicated picture or the scene change, in which the correlation between the frames is low, can be distinguished from fade, in which the correlation between the frames is high.

For example, five kinds of samples per one type of picture are selected out of each type of picture which is determined as fade, scene change, complicated picture, or normal scene by a tester. The sum total of absolute values of the differences between the Nth frame and the N−1th frame is calculated every 5 samples. Then the threshold level Th1 is determined as a border value between the fade and the normal scene or between the scene change and the complicated picture.

For example, with respect to one kind of sample selected out of five kinds of fade type samples, the first sum total of absolute values of differences in luminance and chrominance at all pixels between adjacent frames is calculated as follows:

$$\text{first sum total} = \text{SUM}|Y1-Y1'| + \text{SUM}|Cb1-Cb1'| + \text{SUM}|Cr1-Cr1'|$$

where $Y1$ is luminance of one pixel in the first field corresponding to the Nth frame, $Cb1$ is chrominance blue of the pixel, $Cr1$ is chrominance red of the pixel, $Y1'$ is luminance of one pixel in the first field corresponding to the N−1th frame, $Cb1'$ is chrominance blue of the pixel, $Cr1'$ is chrominance red of the pixel, and SUM provides the sum of the differences at all pixels with respect to one field.

Next, the second sum total of absolute values of differences in luminance and chrominance at all pixels between the frames is calculated as follows:

$$\text{second sum total} = \text{SUM}|Y2-Y2'| + \text{SUM}|Cb2-Cb2'| + \text{SUM}|Cr2-Cr2'|$$

where $Y2$ is luminance of one pixel in the second field corresponding to the Nth frame, $Cb2$ is chrominance blue of the pixel, $Cr2$ is chrominance red of the pixel, $Y2'$ is luminance of one pixel in the second field corresponding to the N−1th frame, $Cb2'$ is chrominance blue of the pixel, $Cr2'$ is chrominance red of the pixel, and SUM provides the sum of the differences at all pixels with respect to one field.

Then the sum of the first sum total and the second sum total is calculated so that the sum total of absolute values of the differences between the frames with one frame distance is calculated with respect to one kind of sample selected out of five kinds of fade type samples. Hereafter, the sum total is calculated in the same manner with respect to other four kinds of samples. Further, the sum total is calculated in the same manner with respect to other types of samples, i.e. the scene change, the complicated picture, and the normal scene.

According to analysis for the sums calculated as mentioned above, the border value between the sum of the fade or the normal scene type samples and the sum of the scene change or the complicated picture type samples is detected. Then this border value is determined as the threshold level Th1. Further, in this embodiment, the threshold level Th1 is calculated using pixel value at full resolution in MPEG2 (720 pixels.times.480 pixels). The threshold level Th1 changes with pixel value.

However, if the threshold level Th1 has any value concretely, the sum in the fade or the normal scene is smaller than the sum in the scene change or the complicated picture.

Therefore, if the sum read by the judging part 13 is smaller than the threshold level Th1, the correlation between the frames is high, so that there is a possibility that a sequence of encoded frames are the fade frames or the normal frames. Then, in this case, flag F1 is set for "1" (step S3, refer to FIG. 5). On the other hand, if the sum read by the judging part 13 is greater than the threshold level Th1, the correlation between the frames is low, so that the possibility that a sequence of encoded frames are the fade frames is low. In this case, there is a possibility that a sequence of encoded frames are the scene change or the complicated picture. Then, flag F1 is reset for "0" (step S4, refer to FIG. 5).

Next, the frame outputted from the preprocessor 1 is accepted to the motion compensation 3. In the motion compensation 3, the above-mentioned detection for the motion vector is performed. Further, in the distortion calculator 4, the above-mentioned calculation is performed. Then judging part 13 judges whether the calculation of the distortion value is completed or not (step S10, refer to FIG. 6). In case that the calculation is completed (step S10: YES), the distortion value is read from the distortion calculator 4 by the judging part 13. For example, in FIG. 2, assume that the objective frame of encoding is the sixth frame, the distortion sum calculator 4 calculates the sum total of absolute values of the differences in luminance at each pixel between each macroblock of the sixth frame and the corresponding macroblock of the third frame. Then the calculator 4 adds the sum total every macroblock, and further, adds the sums at one frame to output the distortion value to the judging part 13. The judging part 13 reads the distortion value, then judges the degree of the correlation between the sixth frame and the third frame more precisely. More specifically, the judging part 13 judges whether the distortion value is greater than the prescribed threshold level Th2 (step S12, refer to FIG. 6). This threshold level Th2 is determined by experiment so that the normal scene, in which the correlation between the frames at each pixel is high, can be distinguished from the complicated picture, in which the correlation between the frames at each pixel is low, scene change, or fade.

For example, by using the same samples as the calculation of the threshold level Th1 is excuted, the distortion value between the Nth frame and the (N−1)th frame is calculated by following equation.

$$\text{distortion value} = \text{SUM}|Y-Y'|$$

where SUM provides the sum total of the distortion value at one frame, which is calculated at each macroblock in one frame. Further, Y is luminance which is calculated at each macroblock of the Nth frame. Y' is luminance which is calculated at each macroblock of the N−1th frame.

The above-mentioned distortion value is calculated with respect to five kinds of samples of fade type picture. After that, the distortion value is calculated with respect to scene change, complicated picture, and normal scene in the same manner.

According to analysis for the distortion value calculated as mentioned above, the border value between the distortion value of the normal scene and the distortion value of fade, the scene change, or the complicated picture is detected. Then this border value is determined as the threshold level Th2. Further, in this embodiment, the threshold level Th2 is calculated using pixel value at full resolution in MPEG2 (720 pixels.times.480 pixels). The threshold level Th2 changes with pixel value.

However, if the threshold level Th2 has any value concretely, the distortion value in the normal scene is smaller than the threshold level Th2, and the distortion value in the fade, the scene change, or the complicated picture is greater than the threshold level Th2.

Therefore, if the distortion value read by the judging part 13 is greater than the threshold level Th2, there is a possibility that a sequence of encoded frames are the complicated picture, the scene change, or the fade. Then, in this case, flag F2 is set for "1" (step S13, refer to FIG. 6). On the other hand, if the distortion read by the judging part 13 is smaller than the threshold level Th2, there is a possibility that a sequence of encoded frames are the normal frames. Then, in this case, flag F2 is reset for "0" (step S14, refer to FIG. 6).

Figure 6:
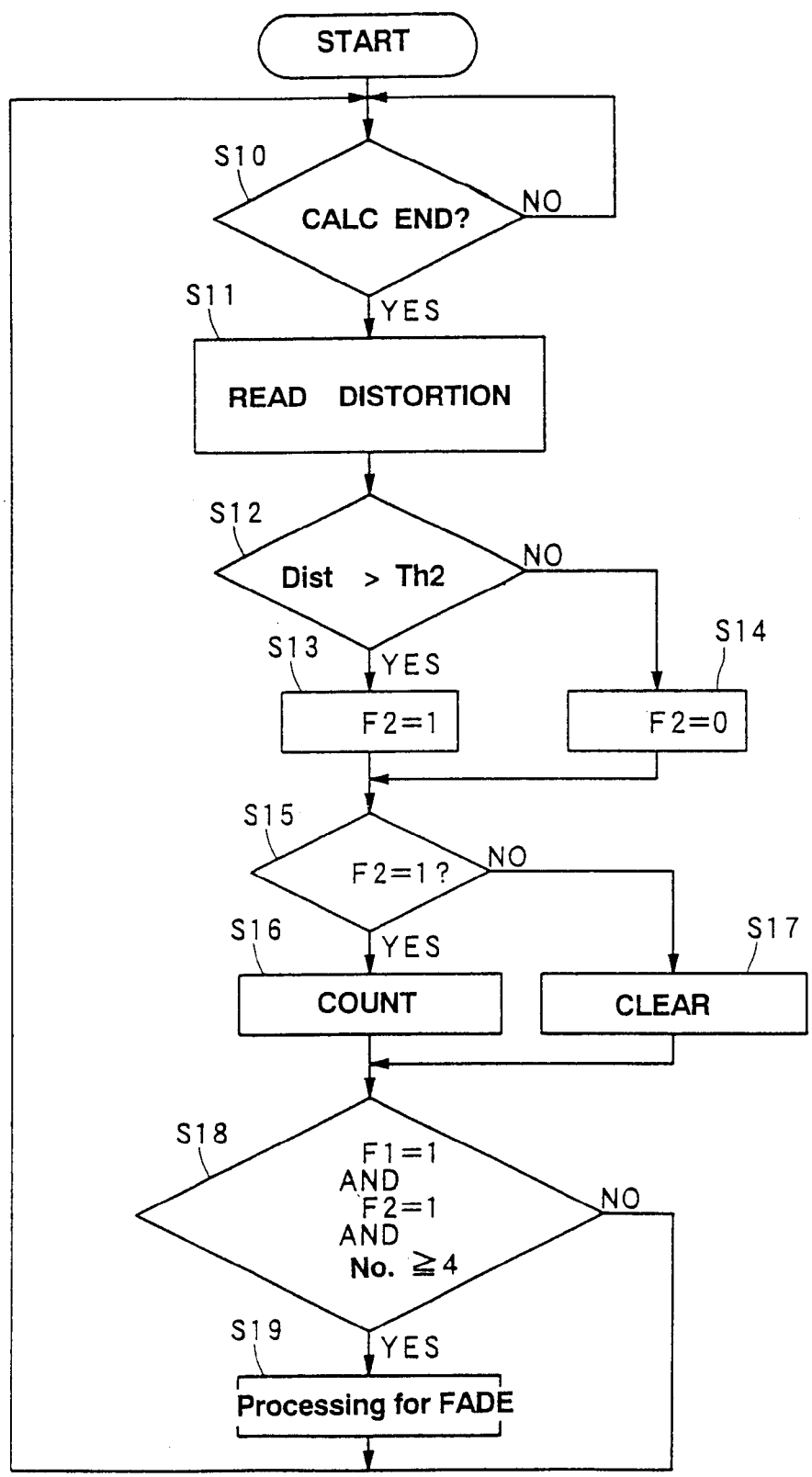
FIG. 6 is a flow diagram of judging process on the basis of a total of an absolute value of estimate error in the encoding apparatus.
Figure 7:
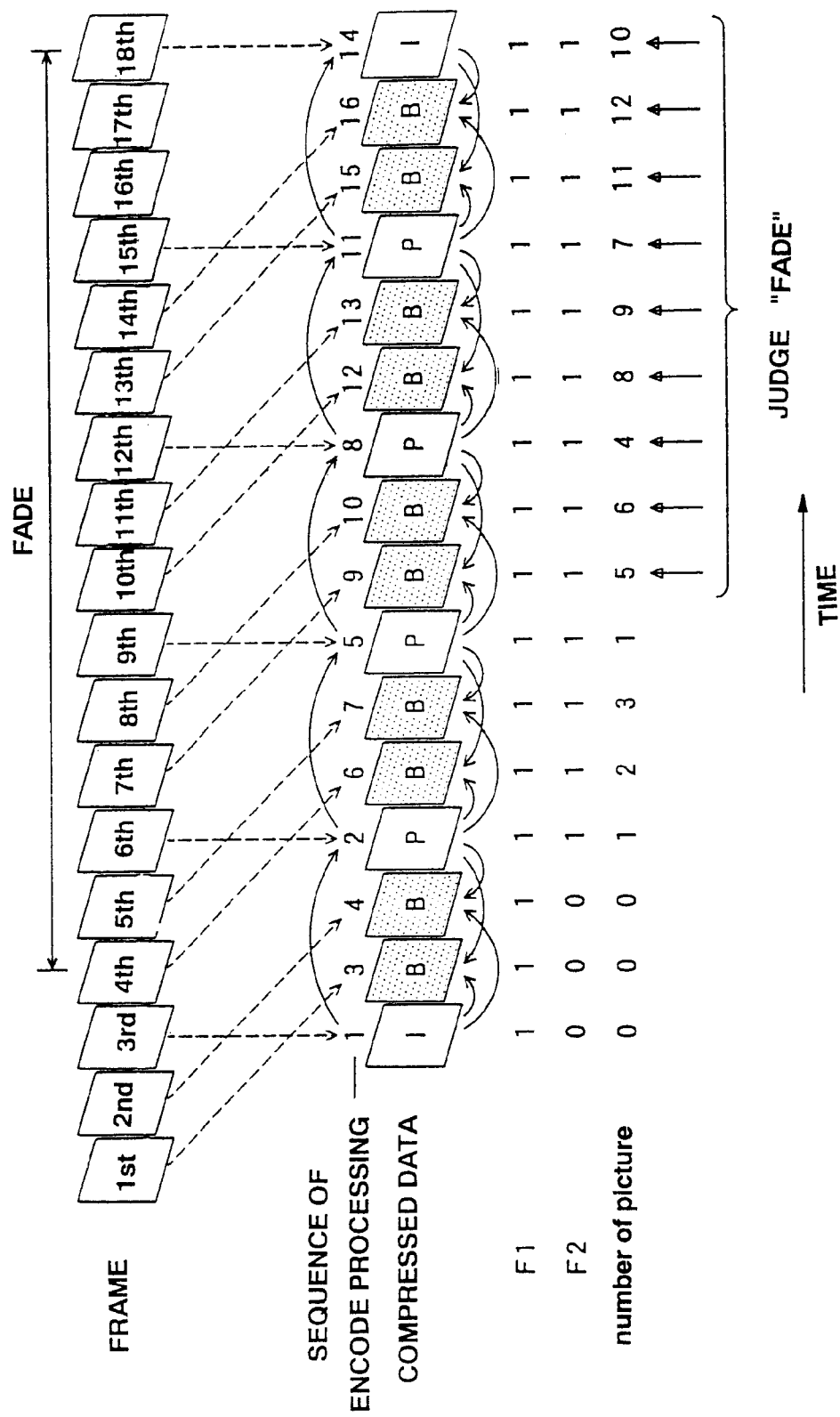
FIG. 7 is a view for explaining an example of fade detecting in the encoding apparatus.

Next, the judging part 13 judges whether the flag F2 is set or not (step s15, refer to FIG. 6). In case that the flag F2 is set, the judging part 13 counts the number of the frame (step s16). The fade has tendency to indicate continuously the distortion value which is greater than the threshold level Th2 over a plurality of frames, while, in case of the scene change, the degree of the continuity of the distortion value is not greater than the fade. Therefore, in case that the flag F2 is set, counting the number of the frame provides an accurate distinction between the fade and the scene change. On the other hand, in case that the flag F2 is not set, the number of frame is cleared back to zero (step S17).

Next, the judging part 13 judges whether the both flag F1 and F2 are set for "1" and the number of frame is over four or not (step S18). That is, in case that the flag F1 is set for "1", there is a possibility that the frame is the fade or the normal picture. In case that the flag F2 is set for "1", there is a possibility that the frame is the fade, the complicated picture, or the scene change. Therefore, the both flag F1 and F2 are set for "1", there is an extremely high possibility that the frame is the fade.

In some rare cases, even though the scene change is provided, the sum of the inter-frame differences are greater than the threshold Th1, and the flag F1 is set for "1" by mistake. In this case, the both flags are set for "1", even though the scene change is provided.

However, the continuity of the state that the distortion value is greater than the threshold Th2 has the differences between the scene change and the fade. That is, in the fade, the distortion value is greater than the threshold Th2 continuously over a plurality of frames, for example, encoding is executed in the status that the flag F2 is set for "1" over four frames. On the other hand, in the scene change, the distortion value is greater than the threshold Th2 only between the two consecutive frames. If the judging is performed in the sequence of encoding processing, the distortion value is not greater than the threshold Th2 over four frames as the fade.

Therefore, in this embodiment, to prevent the fade from being judged for the scene change by mistake, in the case that the flag F2 is set "1", the number of the frame is counted (step S15). Further, in the case that the flag F2 is reset for "0", the number of the frames is cleared back to zero (step S17). Moreover, in the case that the both flag are set for "1", the number of the encoded frame is counted. Then the fade is detected when the number is over four (step S18).

Next, in the case that the both flag F1 and F2 are set for "1" and the number of the encoded frame is four (step S18: YES), the current frame is detected as the fade. Then the processing corresponding to the fade is performed (step S19). For example, in the case of the fade, the processing whereby the differences are calculated at whole frame as the inter-frame differences are calculated is preferable without using motion vector. Therefore, the judging part 13 provides instructions whereby the processing for the fade is performed to the intra/inter-frame predictor 12. Or the judging part 13 provides instructions whereby the encoding rate preferable for the fade is performed to the encode assign part 8. In this manner, distortions of reproduction can be reduced.

In this embodiment, the judgement of the fade is performed as above-mentioned, so that an accurate judgement of the fade can be performed. Further, the frame memories of the preprocessor 1 and the intra/inter-frame predictor 12, which is provided as in the past are used for the memories for the judgement in this embodiment. Resources can be used effectively, Increasing the cost of production is restrained.

Next, referring to FIG. 5, FIG. 6, FIG. 7 and FIG. 8, the judgment processing will be explained on basis of concrete case.

First, the judgment processing for the fade is explained. For example, assume that in FIG. 7 the fade is from the fourth frame to the eighteenth frame, and the current frame for encoding is the sixth frame, the sum of the inter-frame differences between the sixth frame and the fifth frame, which is a previous frame to the sixth frame in a sequence of source frame, is calculated by the calculator 2. In the fade, the sum between the adjacent frames in a sequence of source frame is smaller than the threshold level Th1. Therefor, the judging part 13 judges that the sum between the sixth frame and the fifth frame is smaller than the threshold level Th1 (step S2). Then the flag F1 is set for "1" (step S3). Next, in the motion compensation 3, the motion vector is detected for the sixth frame, and the distortion value between the sixth frame and the third frame encoded as I-picture is calculated. In the fade, the distortion between the adjacent frames in a sequence of the encode processing is greater than the threshold level Th2. Therefore, the judging part 13 judges that the distortion between the sixth frame and the third frame is greater than the threshold level Th2 (step S12). Then the flag F2 is set for "1" (step S13). Therefore, The judging part 13 counts the number of the frame (step S16). Then the number the frame is "1". As a result of this processing, the both flag F1 and F2 are "1", while the number of the frame is "1", so that in the step 18, the judging judges "NO".

Next, the first frame and the second frame is the objective frame for encoding. These frames are the normal picture ao that the correlation between the adjacent frames in a sequence of the source frame is high. Therefore, the judging part 13 judges that the inter-frame differences is smaller than (step S2). Then the flag F1 is set "1". Further, the distortion value is calculated between the third frame and the sixth frame. The sixth frame is the fade, The distortion value between the first frame and the second frame is provided as large to some degree. However, the third, the second, and the first frame are the normal picture, not the fade. Therefore, the large distortion value between these frames is not provided as large. Then the distortion value between the first and the second frame as an end result is smaller than the threshold level Th2 (step S2). The flag F2 is reset "0" (step S14). As a result of this processing, the number of frame is cleared back to zero, and in the step 18, the judging judges "NO".

Next, the current objective frame for encoding is the ninth frame, the sum of the inter-frame differences between the eighth frame and the ninth frame is calculated by the calculator 2. The judging part 13 judges that the sum between the eighth frame and the ninth frame is smaller than the threshold level Th1 (step S2). Then the flag F1 is set for "1" (step S3). Next, in the motion compensation 3, the distortion value between the sixth frame and the ninth frame is calculated. Therefore, the judging part 13 judges that the distortion between the sixth frame and the ninth frame is greater than the threshold level Th2 (step S12). Then the flag F2 is set for "1" (step S13). Therefore, The judging part 13 counts the number of the frame (step S16). Then the number the frame is "1". As a result of this processing, the both flag F1 and F2 are "1", while the number of the frame is "1", so that in the step 18, the judging judges "NO".

Next, the current objective frame for encoding is the fourth frame, the sum of the inter-frame differences between the third frame and the fourth frame is calculated by the calculator 2. The judging part 13 judges that the sum between the third frame and the fourth frame is smaller than the threshold level Th1 (step S2). Then the flag F1 is set for "1" (step S3). Next, in the motion compensation 3, the distortion value between the sixth frame and the third frame, and between the ninth frame and the third frame are calculated. The frames are all fade, therefore, the judging part 13 judges that the distortion between the frames is greater than the threshold level Th2 (step S12). Then the flag F2 is set for "1" (step S13). Therefore, The judging part 13 counts the number of the frame (step S16). Then the number the frame is "2", and in the step 18, the judging judges "NO".

Next, the current objective frame for encoding is the fifth frame, the sum of the inter-frame differences between the fourth frame and the fifth frame is calculated by the calculator 2. The frames are fade, so that the judging part 13 judges that the sum between the fourth frame and the fifth frame is smaller than the threshold level Th1 (step S2). Then the flag F1 is set for "1" (step S3). Next, in the motion compensation 3, the distortion value between the sixth frame and the fifth frame, and between the ninth frame and the fifth frame are calculated. The frames are all fade, therefore, the judging part 13 judges that the distortion between the frames is greater than the threshold level Th2 (step S12). Then the flag F2 is set for "1" (step S13). Therefore, The judging part 13 counts the number of the frame (step S16). Then the number the frame is "3", and in the step 18, the judging judges "NO".

Next, the current objective frame for encoding is the twelfth frame, the sum of the inter-frame differences between the twelfth frame and the eleventh frame is calculated by the calculator 2. The frames are fade so that the judging part 13 judges that the sum between the eleventh frame and the twelfth frame is smaller than the threshold level Th1 (step S2). Then the flag F1 is set for "1" (step S3). Next, in the motion compensation 3, the distortion value between the ninth frame and the twelfth frame are calculated. The frames are all fade, therefore, the judging part 13 judges that the distortion between the frames is greater than the threshold level Th2 (step S12). Then the flag F2 is set for "1" (step S13). Further, the judging part 13 counts the number of the frame (step S16). Then the number the frame is "4". Therefore, in the step S18, the judging part 18 judges "YES", and detects the fade. Then the judging part 13 provides instructions whereby the processing for the fade is performed to the intra/inter-frame predictor 12.

After that, as a result that the processing is repeated in the same manner, the both flag F1 and F2 are set "1", the number of frame is counted consecutively and increasing. Therefore, in the step 18, the judging part 13 judges "YES", the processing for the fade is continued.

Figure 8:
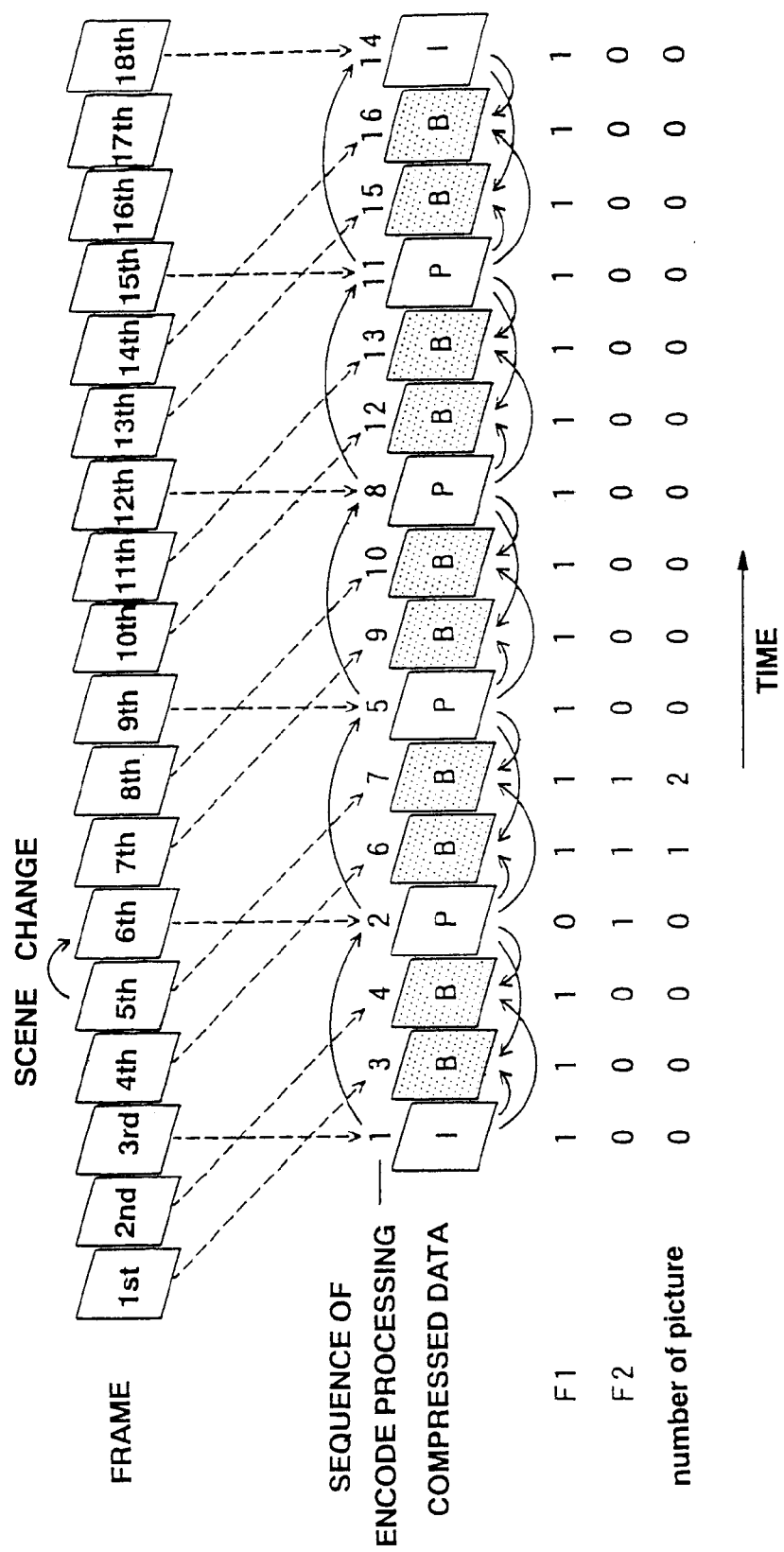
FIG. 8 is a view for explaining an example of scene change detecting in the encoding apparatus.

Next, the judgment processing for the scene change is explained referring to FIG. 8. For example, assume that the scene change is generated between the fifth frame and the sixth frame, and the current frame for encoding is the sixth frame, the sum of the inter-frame differences between the sixth frame and the fifth frame is calculated by the calculator 2. In the scene change, there is no correlation between the frames, so that the judging part 13 judges the sum between the frames is greater than the threshold level Th1 (step S2). Then the flag F1 is reset for "0" (step S4). Next, in the motion compensation 3, the distortion value between the sixth frame and the third frame encoded previously at one frame is calculated. However, there is no correlation between each frame in the range from the first frame to the fifth frames and each frame after the sixth frame at each macroblock. Therefore, the judging part 13 judges that the distortion between the frames is greater than the threshold level Th2 (step S12). Then the flag F2 is set for "1" (step S13). Therefore, the flag F1 is set for "1", so that the judging part 13 judges "NO" in the step 18.

Next, the first frame and the second frame is the objective frame for encoding. These frames are the normal picture before the scene change starts so that the judging part 13 judges that the inter-frame differences is smaller than the threshold Th1 (step S2). Then the flag F1 is set "1" (step S3). Further, the distortion value between the frames is smaller than the threshold level Th2 (step S12), so that the flag F2 is reset "0" (step S14). Moreover, the number of frame is not counted. Therefore, in the step 18, the judging part 13 judges "NO".

Next, the current objective frame for encoding is the ninth frame, the sum of the inter-frame differences between the eighth frame and the ninth frame is calculated by the calculator 2. The frames, which are the normal pictures, are generated after the scene change starts. Therefore, the judging part 13 judges that the sum between the frames is smaller than the threshold level Th1 (step S2). Then the flag F1 is set for "1" (step S3). Next, in the motion compensation 3, the distortion value between the ninth frame and the sixth frame encoded as P-picture is calculated. However, the frames are the normal pictures, therefore, the judging part 13 judges that the distortion between the frames is smaller than the threshold level Th2 (step S12). Then the flag F2 is reset for "0" (step S14). Therefore, The judging part 13 does not count the number of the frame (step S17). Then in the step 18 the judging part judges "NO".

Next, the current objective frame for encoding is the fourth frame, the sum of the inter-frame differences between the third frame and the fourth frame is calculated by the calculator 2. The frames, which are the normal picture, are generated before the scene change starts, so that the correlation between the frames is high. Therefore, the judging part 13 judges that the sum between the frames is smaller than the threshold level Th1 (step S2). Then the flag F1 is set for "1" (step S3). Next, in the motion compensation 3, the distortion value between the sixth frame and the sixth frame is calculated. However, the fourth frame is generated before the scene change starts, and the sixth frame and the ninth frame are generated after the scene change starts. Therefore, there is no correlation between these frames, so that the judging part 13 judges that the distortion between these frames is greater than the threshold level Th2 (step S12). Then the flag F2 is set for "1" (step S13). Therefore, The judging part 13 counts the number of the frame (step S16). Then the number the frame is "1." In this case, the both flag F1 and F2 are set for "1", therefore, in the step 18, the judging part 13 judges "NO".

Next, the current objective frame for encoding is the fifth frame, the sum of the inter-frame differences between the fourth frame and the fifth frame is calculated by the calculator 2. The frames, which are the normal picture, are generated before the scene change starts, so that the correlation between the frames is high. Therefore, the judging part 13 judges that the sum between the frames is smaller than the threshold level Th1 (step S2). Then the flag F1 is set for "1" (step S3). Next, in the motion compensation 3, the distortion value between the sixth frame and the fifth frame are calculated. In the same as the fourth frame, the judging part 13 judges that the distortion between the frames is greater than the threshold level Th2 (step S12). Then the flag F2 is set for "1" (step S13). Therefore, The judging part 13 counts the number of the frame (step S16). Then the number the frame is "2." In this case, the both flag F1 and F2 are set for "1", while the number the frame is "2." Therefore, in the step 18, the judging part 13 judges "NO".

Next, the current objective frame for encoding is the twelfth frame, the sum of the inter-frame differences between the twelfth frame and the eleventh frame is calculated by the calculator 2. The frames, which are the normal picture, are generated before the scene change starts, so that the correlation between the frames is high. Therefore, the judging part 13 judges that the sum between the frames is smaller than the threshold level Th1 (step S2). Then the flag F1 is set for "1" (step S3). Next, in the motion compensation 3, the distortion value between the ninth frame and the twelfth frame are calculated. The frames, which are the normal picture, are generated after the scene change starts, therefore, the judging part 13 judges that the distortion between the frames is smaller than the threshold level Th2 (step S12). Then the flag F2 is reset for "0" (step S14). In this manner, the flag F2 is reset for "0" (step S14), therefore, the judging part 13 clears the number of the frame back to zero (step S17). In this case, the flag F2 is not set for "1", and the number of frame is zero, therefore, in the step S18, the judging part 13 judges "NO".

As mentioned above, in the case that the scene change is generated, the both flag are set for "1", and the number of frame is counted in some cases. However, the scene change is not generated continuously over a plurality of frames, the number of frame does not reach over four.

Further, in FIG. 8, if the flag F1 is set for "1" by mistake at the processing for the sixth frame even though the scene change is generated, the number of frame does not reach over four because at the processing of first frame, which will be processed next, the both flag F1 and F2 are reset for "0".

In this manner, the fade can be detected accurately without misjudging for the scene change.

Furthermore, the detailed explanation of the complicated picture is omitted, however, in the complicated picture, the flag F1 is always reset for "0", so that the judgement in the step 18 is always "NO". Therefore, the fade can be detected accurately without misjudging for the complicated picture.

Further, in the above-mentioned embodiment, the picture type, i.e., I-picture, B-picture, and P-picture are determined regularly at the preprocessor 1 beforehand. However, the picture type can be determined on the basis of the correlation between the frames, i.e., the objective frames for encoding.

In the above-mentioned embodiment, the invention is adapted to MPEG2 standard of compression system, however, the invention can be adapted to the encoding apparatus which performs optimizations for encoding rate and encoding processing in real time.

The invention may be embodied in other specific forms without departing from the the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No.JP11-59819 filed on Mar. 8, 1999 including the specification, claims, drawings and summary is incorporated herein by reference in its entirety.

What is claimed is:

1. An apparatus for detecting fade transitions in image data used for image data compression comprising:

an inter-frame difference calculation device for calculating an absolute value of a difference at each pixel between two frames, and a sum of absolute values of differences at all pixels of one frame;

a pixel block detection device for calculating an absolute value of a difference at each pixel between two pixel blocks, each of which is subdivided from one frame, and detecting a pair of blocks to obtain the minimum value for a sum of absolute values of differences at all pixels of one block;

an predictive difference calculation device for calculating a total of sums of the absolute values of differences at all pixels of one block in each pair of blocks detected by said pixel block detection device, for one frame; and a judging device for judging whether said fade transitions are generated or not, on the basis of said sum of the absolute values at all pixels of one frame calculated by said inter-frame difference calculation device and said total calculated by said predictive difference calculation device.

2. An apparatus for detecting fade transitions in image data used for image data compression comprising:

an inter-frame difference calculation device for calculating an absolute value of a difference at each pixel between two frames, and a sum of absolute values of differences at all pixels of one frame;

a pixel block detection device for calculating an absolute value of a difference at each pixel between two pixel blocks, each of which is subdivided from one frame, and detecting a pair of blocks to obtain the minimum value for a sum of absolute values of differences at all pixels of one block;

an predictive difference calculation device for calculating a total of sums of the absolute values of differences at all pixels of one block in each pair of blocks detected by said pixel block detection device, for one frame;

a judging device for judging whether said fade transitions are generated or not, on the basis of said sum of the absolute values at all pixels of one frame calculated by said inter-frame difference calculation device and said total calculated by said predictive difference calculation device; and wherein said judging device is provided with:

a first compare device for comparing said sum of the absolute values at all pixels of one frame with a first reference value; and a second compare device for comparing said total with a second reference value, and said judging device judges that said fade transitions are generated in the case where such a status that said sum is smaller than said first reference value as a result of comparing by said first compare device, and said total is greater than said second reference value as a result of comparing by said second compare device, is continued for a plurality of frames.

3. An apparatus according to claim 2, wherein said first reference is a border value between said total in the frames where at least a scene change is generated and said total in the frames where a fade transition or a normal picture is generated, and said second reference is a border value between said frame total in the frame where a fade transition or a scene change is generated and said total in the frames where a normal picture is generated.

4. An apparatus for information encoding comprising
(a) a fade detecting device for detecting fade transitions in image data used for image data compression is provided with: an inter-frame difference calculation device for calculating an absolute value of a difference at each pixel between two frames, and a sum of absolute values of differences at all pixels of one frame; a pixel block detection device for calculating an absolute value of a difference at each pixel between two pixel blocks, each of which is subdivided from one frame, and detecting a pair of blocks to obtain the minimum value for a sum of absolute values of differences at all pixels of one block; an predictive difference calculation device for calculating a total of sums of the absolute values of differences at all pixels of one block in each pair of blocks detected by said pixel block detection device, for one frame; and a judging device for judging whether said fade transitions are generated or not, on the basis of said sum of the absolute values at all pixels of one frame calculated by said inter-frame difference calculation device and said total calculated by said predictive difference calculation device,
(b) a rearrange device for rearranging source frames in a encode processing sequence on the basis of a frame memory,
(c) a discrete cosine transform device for performing discrete cosine transform processing for image data,
(d) a quantize device for quantizing said image data transformed by said discrete cosine transform device on the basis of prescribed quantize scale code,
(e) a encoding device for performing variable length encode processing for said quantized image data,
(f) an inverse quantize device for converting said quantized image data into image data,
(g) an inverse discrete cosine transform device for performing inverse direct cosine transform processing for image data converted by said inverse quantize device,
(h) a motion compensation device for having a frame memory, and detecting a motion vector on the basis of said image data transformed by said inverse discrete cosine transform device and the new objective image data, and performing motion compensation processing for said image data transformed by said inverse discrete cosine transform device on the basis of said motion vector,
(i) an operation device for calculating a difference between a source image data and a predictive data generated by said motion compensation device,
(j) said inter-frame difference calculation device calculates said sum on the basis of said frame memory of said rearrange device, and
(k) said predictive difference calculation device calculates said total on the basis of said frame memory of said motion compensation device.

5. An apparatus according to claim 4, wherein said encoding device performs compression encoding processing in MPEG2 standard.

6. An apparatus for information encoding comprising
(a) a fade detecting device for detecting fade transitions in image data used for image data compression is provided with: an inter-frame difference calculation device for calculating an absolute value of a difference at each pixel between two frames, and a sum of absolute values of differences at all pixels of one frame; a pixel block detection device for calculating an absolute value of a difference at each pixel between two pixel blocks, each of which is subdivided from one frame, and detecting a pair of blocks to obtain the minimum value for a sum of absolute values of differences at all pixels of one block; an predictive difference calculation device for calculating a total of sums of the absolute values of differences at all pixels of one block in each pair of blocks detected by said pixel block detection device, for one frame; and a judging device for judging whether said fade transitions are generated or not, on the basis of said sum of the absolute values at all pixels of one frame calculated by said inter-frame difference calculation device and said total calculated by said predictive difference calculation device,
(b) a rearrange device for rearranging source frames in a encode processing sequence on the basis of a frame memory,
(c) a discrete cosine transform device for performing discrete cosine transform processing for image data,
(d) a quantize device for quantizing said image data transformed by said discrete cosine transform device on the basis of prescribed quantize scale code,
(e) a encoding device for performing variable length encode processing for said quantized image data,
(f) an inverse quantize device for converting said quantized image data into image data,
(g) an inverse discrete cosine transform device for performing inverse direct cosine transform processing for image data converted by said inverse quantize device,
(h) a motion compensation device for having a frame memory, and detecting a motion vector on the basis of said image data transformed by said inverse discrete cosine transform device and the new objective image data, and performing motion compensation processing for said image data transformed by said inverse discrete cosine transform device on the basis of said motion vector,
(i) an operation device for calculating a difference between a source image data and a predictive data generated by said motion compensation device,
(j) said inter-frame difference calculation device calculates said sum on the basis of said frame memory of said rearrange device, and
(k) said predictive difference calculation device calculates said total on the basis of said frame memory of said motion compensation device;
wherein said judging device is provided with:
a first compare device for comparing said sum of the absolute values at all pixels of one frame with a first reference value; and
a second compare device for comparing said total with a second reference value, and
said judging device judges that said fade transitions are generated in the case where such a status that said sum is smaller than said first reference value as a result of comparing by said first compare device, and said total is greater than said second reference value as a result of comparing by said second compare device, is continued for a plurality of frames.

7. An apparatus according to claim 6, wherein
said first reference is a border value between said sum total in the frames where at least a scene change is generated and said total in the frames where a fade transition or a normal picture is generated, and said second reference is a border value between said total in the frame where a fade transition or a scene change is generated and said total in the frames where a normal picture is generated.

8. A method for detecting fade transitions in image data signal used for image data compression, comprising the processes of:

calculating an absolute value of a difference at each pixel between two frames, and a sum of absolute values of differences at all pixels of one frame;

calculating an absolute value of a difference at each pixel between two pixel blocks, each of which is subdivided from one frame, and detecting a pair of blocks to obtain the minimum value for a sum of absolute values of differences at all pixels of one block;

calculating a total of sums of the absolute values of differences at all pixels of one block in each pair of blocks detected; and judging whether said fade transitions is generated or not, on the basis of said sum of the absolute values at all pixels of one frame and said total.

9. A method for detecting fade transitions in image data signal used for image data compression, comprising the processes of:

calculating an absolute value of a difference at each pixel between two frames, and a sum of absolute values of differences at all pixels of one frame;

calculating an absolute value of a difference at each pixel between two pixel blocks, each of which is subdivided from one frame, and detecting a pair of blocks to obtain the minimum value for a sum of absolute values of differences at all pixels of one block;

calculating a total of sums of the absolute values of differences at all pixels of one block in each pair of blocks detected; and judging whether said fade transitions is generated or not, on the basis of said sum of the absolute values at all pixels of one frame and said total;

wherein, said judging process is provided with: a comparing process of said sum of the absolute values at all pixels of one frame with a first reference value; and comparing process of said total with a second reference value, and said judging process of that said fade transitions are generated in the case where such a status that said sum is smaller than said first reference value as a result of said comparing process, and said total is greater than said second reference value as a result of said comparing process, is continued for a plurality of frames.

10. An method according to claim 9, wherein said first reference is a border value between said sum in the frames where at least a scene change is generated and said total in the frames where a fade transition or a normal picture is generated; and said second reference is a border value between said total in the frame where a fade transition or a scene change is generated and said total in the frames where a normal picture is generated.

11. A method for information encoding comprising processes of (a) detecting fade transitions in image data used for image data compression provided with: calculating an absolute value of a difference at each pixel between two frames, and a sum of absolute values of differences at all pixels of one frame; calculating an absolute value of a difference at each pixel between two pixel blocks, each of which is subdivided from one frame, and detecting a pair of blocks to obtain the minimum value for a sum of absolute values of differences at all pixels of one block; calculating a total of sums of the absolute values of differences at all pixels of one block in each pair of blocks detected, for one frame; and judging whether said fade transitions are generated or not, on the basis of said sum of the absolute values at all pixels of one frame and said total, (b) rearranging source frames in a encode processing sequence on the basis of a frame memory, (c) performing discrete cosine transform processing for image data, (d) quantizing said image data transformed by said discrete cosine transform process on the basis of prescribed quantize scale code, (e) performing variable length encode processing said quantized image data, (f) converting said quantized image data into image data, (g) performing inverse direct cosine transform processing for image data converted by said inverse quantize process, (h) detecting a motion vector on the basis of said image data transformed by said inverse discrete cosine transform process and the new objective image data, and performing motion compensation processing for said image data transformed by said inverse discrete cosine transform process on the basis of said motion vector, (i) calculating a difference between a source image data and a predictive data generated by said motion compensation process, (j) said calculating process of said sum is on the basis of said frame memory, and (k) said calculating process of said total is on the basis of said frame memory.

12. A method according to claim 11, wherein said encoding device performs compression encoding processing in MPEG2 standard.

13. A method for information encoding comprising processes of (a) detecting fade transitions in image data used for image data compression provided with: calculating an absolute value of a difference at each pixel between two frames, and a sum of absolute values of differences at all pixels of one frame; calculating an absolute value of a difference at each pixel between two pixel blocks, each of which is subdivided from one frame, and detecting a pair of blocks to obtain the minimum value for a sum of absolute values of differences at all pixels of one block; calculating a total of sums of the absolute values of differences at all pixels of one block in each pair of blocks detected, for one frame; and judging whether said fade transitions are generated or not, on the basis of said sum of the absolute values at all pixels of one frame and said total, (b) rearranging source frames in a encode processing sequence on the basis of a frame memory, (c) performing discrete cosine transform processing for image data, (d) quantizing said image data transformed by said discrete cosine transform process on the basis of prescribed quantize scale code, (e) performing variable length encode processing said quantized image data, (f) converting said quantized image data into image data, (g) performing inverse direct cosine transform processing for image data converted by said inverse quantize process, (h) detecting a motion vector on the basis of said image data transformed by said inverse discrete cosine transform process and the new objective image data, and performing motion compensation processing for said image data transformed by said inverse discrete cosine transform process on the basis of said motion vector, (i) calculating a difference between a source image data and a predictive data generated by said motion compensation process, (j) said calculating process of said sum is on the basis of said frame memory, and (k) said calculating process of said total is on the basis of said frame memory;

wherein said judging process is provided with:
    a comparing process of said sum of the absolute values at all pixels of one frame with a first reference value; and
    a comparing process of said total with a second reference value, and
    said judging process of that said fade transitions are generated in the case where such a status that said total is smaller than said first reference value as a result of said comparing process, and said total is greater than said second reference value as a result of said comparing process, is continued for a plurality of frames.

14. A method according to claim 13, wherein said first reference is a border value between said sum in the frames where at least a scene change is generated and said total frames where a fade transition or a normal picture is generated, and said second reference is a border value between said total in the frame where a fade transition or a scene change is generated and said total in the frames where a normal picture is generated.

\* \* \* \* \*